US012050120B2

(12) United States Patent
Schlosser

(10) Patent No.: US 12,050,120 B2
(45) Date of Patent: *Jul. 30, 2024

(54) COMPACT VIBRATING TYPE FLOWMETER

(71) Applicant: MICRO MOTION, INC., Boulder, CO (US)

(72) Inventor: Martin Andrew Schlosser, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,708

(22) Filed: Dec. 7, 2022

(65) Prior Publication Data

US 2023/0102539 A1     Mar. 30, 2023

Related U.S. Application Data

(62) Division of application No. 16/757,742, filed as application No. PCT/US2017/059750 on Nov. 2, 2017, now Pat. No. 11,650,091.

(51) Int. Cl.
*G01F 1/84*     (2006.01)

(52) U.S. Cl.
CPC .......... *G01F 1/8468* (2013.01); *G01F 1/8413* (2013.01)

(58) Field of Classification Search
CPC .............................. G01F 1/8468; G01F 1/8413
USPC .................................................... 73/861.355
See application file for complete search history.

(56) References Cited

U.S. PATENT DOCUMENTS

| 4,879,910 | A | * | 11/1989 | Lew | G01F 1/78 |
| | | | | | 73/861.355 |
| 5,230,254 | A | | 7/1993 | Craft | |
| 5,241,865 | A | | 9/1993 | Lew | |
| 6,722,209 | B1 | | 4/2004 | Fan et al. | |
| 11,650,091 | B2 | * | 5/2023 | Schlosser | G01F 1/8477 |
| | | | | | 73/861.355 |

(Continued)

FOREIGN PATENT DOCUMENTS

| JP | H06235652 A | 8/1994 |
| JP | H11230804 A | 8/1999 |

*Primary Examiner* — Alexander A Mercado
*Assistant Examiner* — Rodney T Frank
(74) *Attorney, Agent, or Firm* — The Ollila Law Group LLC

(57) ABSTRACT

A flowmeter (200) is provided. A first conduit (208A) having an inlet leg (212A) is fluidly coupled to a central conduit portion (212C) being fluidly coupled to an outlet leg (212'A). A second conduit (208B) having an inlet leg (212B) is fluidly coupled to a central conduit portion (212'C) fluidly coupled to an outlet leg (212'B). The flow inlet (210) is fluidly coupled to first ends of the first and second conduit (208A, 208B), and the flow outlet (210') is fluidly coupled to second ends of the first and second conduits (208A, 208B). The inlet legs (212A, 212B) and the outlet legs (212'A, 212'B) comprise central conduit portions (212C, 212'C) disposed therebetween on the respective first and second conduits (208A and 208B). A manifold (206) is fluidly coupled to the inlet legs (212A, 212B) via a first fluid passage defined by the manifold, and the manifold (206) is fluidly coupled to the outlet legs (212'A, 212'B) via a second fluid passage defined by the manifold (206). A vibrable driver (214) is coupled to the manifold.

11 Claims, 5 Drawing Sheets

(56) References Cited

U.S. PATENT DOCUMENTS

2009/0272200 A1 11/2009 Frahnow et al.
2013/0112009 A1 5/2013 Mokady et al.

* cited by examiner

COMPACT VIBRATING TYPE FLOWMETER

CROSS-REFERENCE TO RELATED APPLICATIONS

This is a divisional application of U.S. application Ser. No. 16/757,742, filed on Apr. 20, 2020, entitled "COMPACT VIBRATING TYPE FLOWMETER" which is a National Stage application of International Application No. PCT/US2017/059750, filed Nov. 2, 2017, entitled "COMPACT VIBRATING TYPE FLOWMETER".

TECHNICAL FIELD

The present invention relates to flowmeters, and more particularly to a compact flowmeter and related methods.

BACKGROUND OF THE INVENTION

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay between inlet and outlet measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet end leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate. Drivers and pickoffs, as will be understood by those skilled in the art, may both be referred to as vibratory transducers.

Prior art flowmeters typically utilize two conduits, each having circular cross-sectional areas. In order for Coriolis forces to be measured, bends are generally formed in the conduits, which causes the footprint of the flowmeter to be quite large, with respect to the process line in which it is installed.

Therefore, there is a need in the art for a method and related apparatus to reduce the profile of a flowmeter. There is a need for a method and related apparatus to maintain a minimum fluid velocity such that accurate flow measurements may be acquired for a wide range of flow rates in a flowmeter, yet still be compact.

The present invention overcomes these and other problems, and an advance in the art is achieved. The sensor provided is designed to make compact, effective use of the space within a case having a given circular cross-sectional area. Furthermore, the sensor is balanced along the centerline and functions independently of the case, thus eliminating the need for heavy, expensive, and highly damped cases.

SUMMARY OF THE INVENTION

A flowmeter is provided having a flow inlet and a flow outlet. A first conduit having an inlet leg is fluidly coupled to a central conduit portion, wherein the central conduit portion is further fluidly coupled to an outlet leg. A second conduit having an inlet leg is fluidly coupled to a central conduit portion, wherein the central conduit portion is further fluidly coupled to an outlet leg. The flow inlet is fluidly coupled to a first end of the first conduit and a first end of the second conduit, and the flow outlet is fluidly coupled to a second end of the first conduit and a second end of the second conduit. A manifold is fluidly coupled to the inlet legs and the outlet legs. A driver is coupled to the manifold, wherein the driver is operable to vibrate the first and second conduits.

A flowmeter is provided having a flow inlet and a flow outlet. A first conduit having an inlet leg is fluidly coupled to a central conduit portion, wherein the central conduit portion is further fluidly coupled to an outlet leg. A second conduit having an inlet leg is fluidly coupled to a central conduit portion, wherein the central conduit portion is further fluidly coupled to an outlet leg. The flow inlet is fluidly coupled to a first end of the first conduit and a first end of the second conduit, and the flow outlet is fluidly coupled to a second end of the first conduit and a second end of the second conduit. The inlet legs comprise a first cross-sectional profile and the central conduit portions comprise a second cross-sectional profile that is different from the first cross-sectional profile.

ASPECTS

According to an aspect, a flowmeter (200), comprises a flow inlet, a flow outlet, and a first conduit having an inlet leg fluidly coupled to a central conduit portion, wherein the central conduit portion is further fluidly coupled to an outlet leg. A second conduit having an inlet leg is fluidly coupled to a central conduit portion, wherein the central conduit portion is further fluidly coupled to an outlet leg. The flow inlet is fluidly coupled to a first end of the first conduit and a first end of the second conduit, and the flow outlet is fluidly coupled to a second end of the first conduit and a second end of the second conduit. The inlet legs and the outlet legs comprise central conduit portions disposed therebetween on the respective first and second conduits. A manifold is fluidly coupled to the inlet legs via a first fluid passage defined by the manifold, and the manifold is fluidly coupled to the outlet legs via a second fluid passage defined by the manifold. A driver is coupled to the manifold, wherein the driver is operable to vibrate the first and second conduits.

Preferably, the flowmeter wherein the first and second conduits are configured to be driven in opposite directions about respective bending axes.

Preferably, the first and second conduits maintain a constant cross-sectional area through an entirety of a fluid flow path.

Preferably, the first and second conduits maintain a constant cross-sectional hydraulic diameter through an entirety of a fluid flow path.

Preferably, the first and second conduits are configured to be symmetric in X, Y, and Z planes.

According to an aspect, a flowmeter comprises a flow inlet and a flow outlet. A first conduit having an inlet leg is fluidly coupled to a central conduit portion, wherein the central conduit portion is further fluidly coupled to an outlet leg. A second conduit having an inlet leg is fluidly coupled to a central conduit portion, wherein the central conduit portion is further fluidly coupled to an outlet leg. The flow inlet is fluidly coupled to a first end of the first conduit and a first end of the second conduit, and the flow outlet is fluidly coupled to a second end of the first conduit and a second end of the second conduit. The inlet legs and the outlet legs comprise central conduit portions disposed therebetween on the respective first and second conduits. The inlet legs comprise a first cross-sectional profile and the central conduit portions comprise a second cross-sectional profile that is different from the first cross-sectional profile. A manifold is fluidly coupled to the inlet legs via a first fluid passage defined by the manifold, wherein the manifold is fluidly coupled to the outlet legs via a second fluid passage defined by the manifold.

Preferably, the flowmeter wherein the outlet legs comprise a third cross-sectional profile that is different from the first and second cross-sectional profiles.

Preferably, the at least one cross-sectional profile is hexagonal.

Preferably, the first and second conduits are configured to be driven in opposite directions about respective bending axes.

Preferably, the first and second conduits maintain a constant cross-sectional area through an entirety of a fluid flow path.

Preferably, the first and second conduits maintain a constant cross-sectional hydraulic diameter through an entirety of a fluid flow path.

Preferably, the first and second conduits are configured to be symmetric in X, Y, and Z planes.

DETAILED DESCRIPTION OF THE INVENTION

FIGS. 1-6B and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
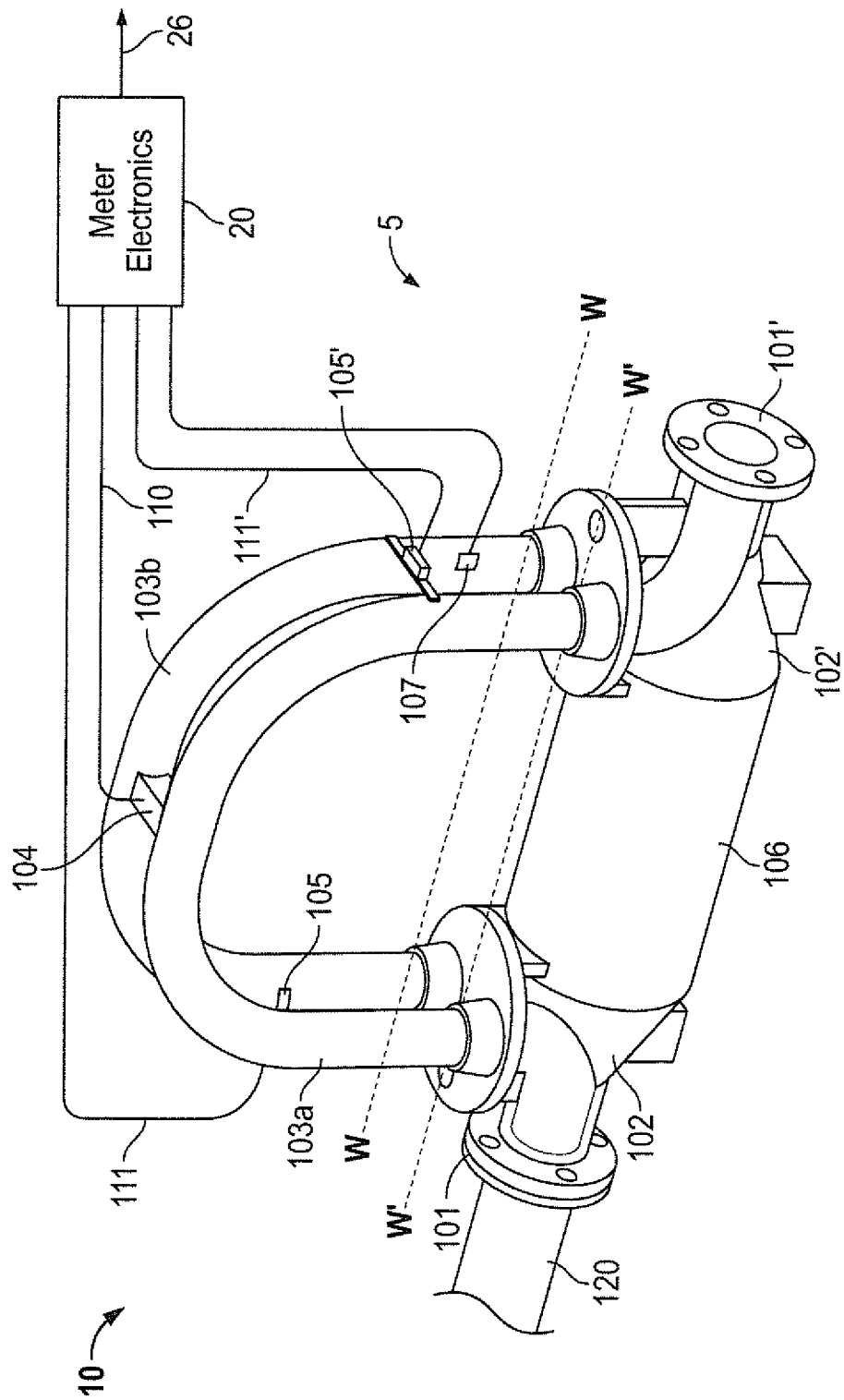
FIG. 1 illustrates a prior art vibrating sensor assembly.

FIG. 1 illustrates an example of a prior art flowmeter 5 in the form of a Coriolis flowmeter comprising a sensor assembly 10 and one or more meter electronics 20. The one or more meter electronics 20 are connected to the sensor assembly 10 to measure a characteristic of a flowing material, such as, for example, density, pressure, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. The manifolds 102, 102' are typically multi-piece assemblies. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in a parallel fashion. When the sensor assembly 10 is inserted into a pipeline system which carries the process material, the material enters sensor assembly 10 via an inlet pipe 120 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode may be the first out of phase bending mode and the conduits 103A and 103B would be selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

In the prior art example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105' and one or more temperature sensors 107, such as a resistive temperature detector (RTD), and use this information to measure a characteristic of a flowing material. Common numbering in figures indicates features common between the prior art meter and embodiments presented herein.

Figure 2:
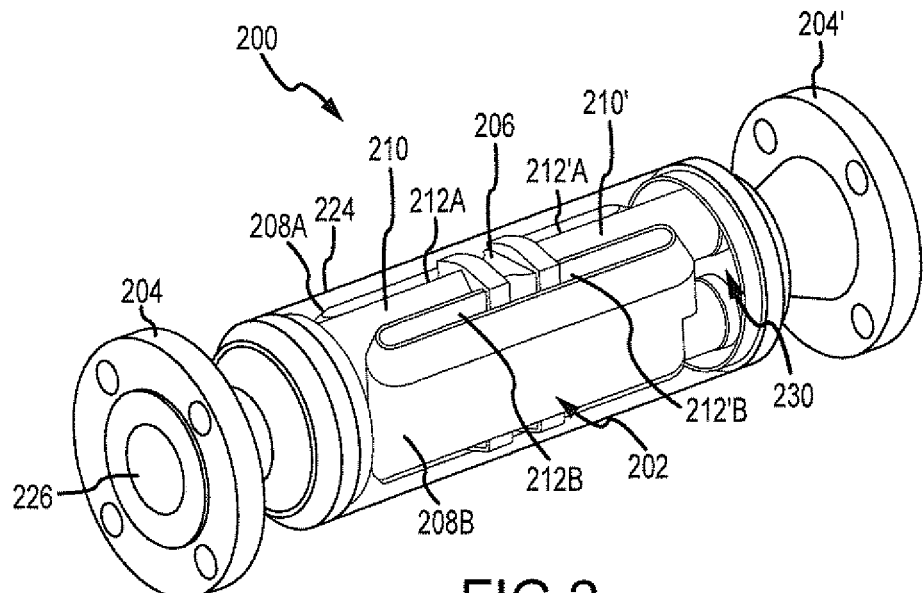
FIG. 2 illustrates a flowmeter according to an embodiment.

An embodiment of a flowmeter 200 is provided in FIG. 2. A sensor assembly 202 is provided. The sensor assembly 202 comprises a pair of flanges 204 and 204', a manifold 206, and conduits 208A and 208B that collectively form a tubeset. The manifold 206 is coupled to a flow inlet 210 and flow outlet 210', inlet legs 212A, 212B and outlet legs 212'A, 212'B. A flowpath is primarily defined by the flow inlet 210 and flow outlet 210', and the conduits as a whole 208A and 208B, including inlet legs 212A, 212B and outlet legs 212'A, 212'B. Inlet legs 212A, 212B and outlet legs 212'A, 212'B have central conduit portions 212C, 212'C (see FIG. 3) disposed therebetween on respective conduits 208A and 208B. In prior art flowmeters, manifolds 102, 102' are typically multi-piece assemblies, but in a present embodiment, the manifold 206 may be constructed as a portion of conduits 208A and 208B, as illustrated. This, however, is not strictly necessary for all embodiments. It should be noted that two conduits 208A, 208B are illustrated, but a flowmeter 200 with a single conduit is contemplated, as is a flowmeter 200 having more than two conduits.

When the sensor assembly 202 is inserted into a pipeline system (not shown) that carries a process material, the material enters the flow inlet 210 of the sensor assembly 202 via inlet orifice 226 and passes through the manifold 206, passes through both inlet legs 212A, 212B, where the process material is directed to enter conduit 208A and 208B sections, flow through conduit 208A and 208B sections to outlet legs 212'A, 212'B, and back into the manifold 206. From here, process material enters the flow outlet 210' where it exits the sensor assembly 202 through the outlet orifice 226' (not visible in FIG. 2).

This sensor assembly 202 design is balanced along a centerline and functions independently of the case 224. Therefore, the case does not require secondary containment, and even a lightweight cylinder may, in embodiments, function well to encapsulate the sensor assembly 202, as heavy or heavily damped case structures are not required for optimal function, as is the case with a number of current prior art flowmeters. It will also be clear that the conduit arrangement may be constructed such that there is symmetry in X, Y, and Z planes.

Figure 3:
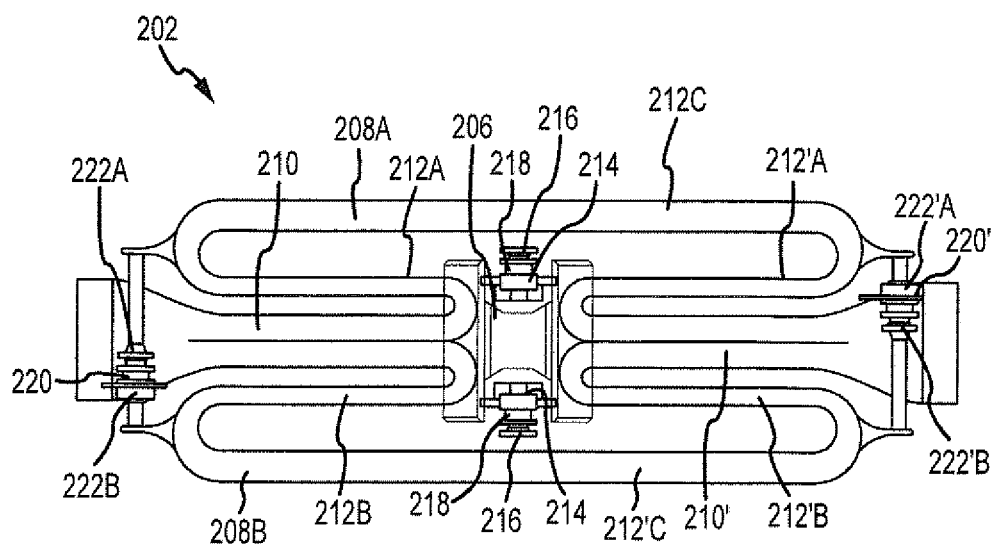
FIG. 3 illustrates a cross-sectional view of a sensor assembly according to an embodiment.
Figure 4:
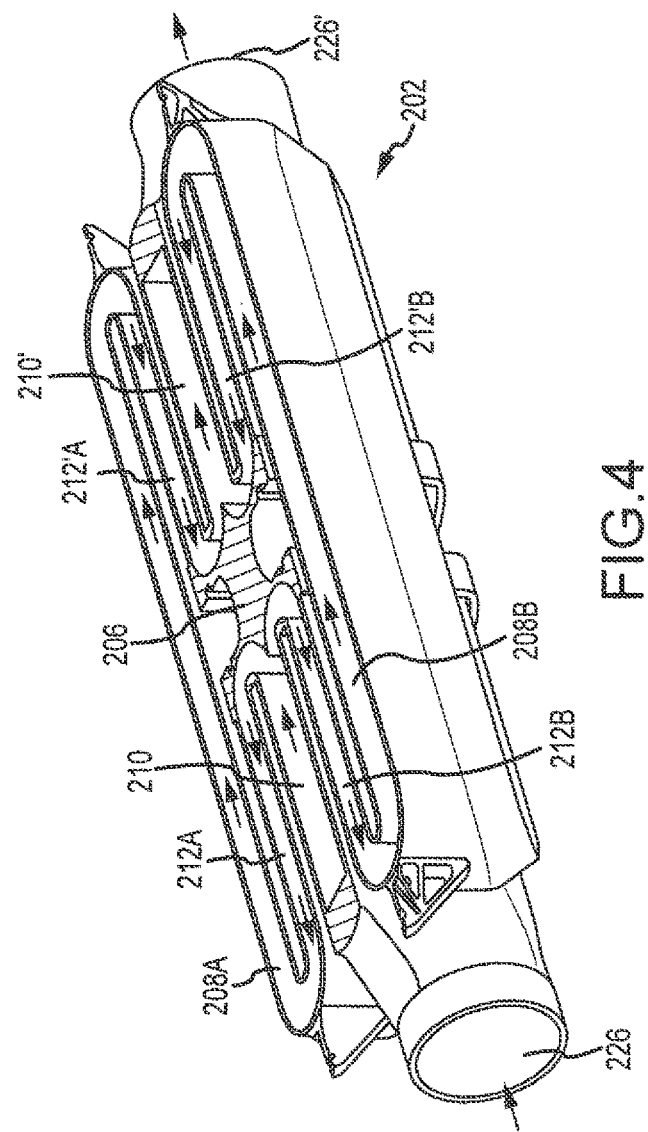
FIG. 4 illustrates another cross-sectional view of a sensor assembly according to an embodiment.

With reference to FIG. 3, the sensor assembly 202 comprises a driver 214. In the embodiment illustrated, the sensor assembly 202 utilizes multiple drivers 214. Embodiments with a single driver that drives each conduit (208A, 208B) are contemplated, however. In one embodiment, the driver 214 is affixed to the manifold 206 and to the conduits 208A and 208B in a position where the driver 214 can vibrate the conduits 208A, 208B in a drive mode. More particularly, the driver 214 includes a first driver component 216 coupled to conduit 208A, 208B and a second driver component 218 coupled to manifold 206. In an embodiment, the driver 214 includes a first driver component 216 coupled to conduit 208A and an additional first driver component 216 coupled to the opposing conduit 208B. In yet another embodiment, a single driver 215 may vibrate both conduits. In yet another embodiment, a driver is provided to drive each conduit (208A, 208B), and a portion of each driver is coupled to each conduit (208A, 208B).

The driver 214 may comprise one of many well-known arrangements, such as a magnet mounted to the conduit 208A and an opposing coil mounted to the opposing conduit 208B or manifold 206. The driver 214 may also comprise an arrangement such as a coil mounted to the conduit 208A and an opposing magnet mounted to the manifold 206. The driver may comprise a single coil or magnet mounted on the manifold, while each conduit (208A, 208B) comprises a magnet or coil, respectively, which may be driven by the driver.

Figure 6B:
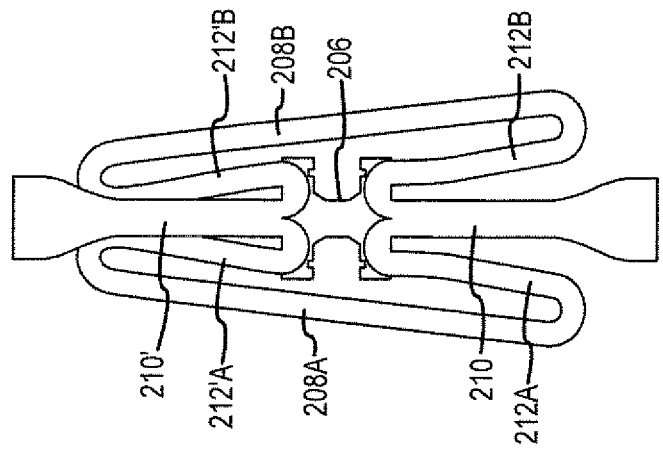
FIG. 6B illustrates an embodiment of a sensor assembly exhibiting an exaggerated bending mode.
Figure 6A:
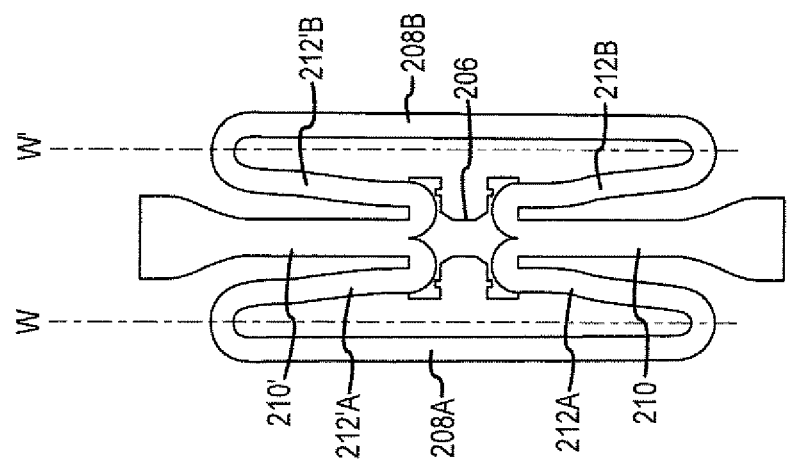
FIG. 6A illustrates bending axes of an embodiment of a sensor assembly according to an embodiment.

In some embodiments, the drive mode may be the first out of phase bending mode and the conduits 208A and 208B would be selected and appropriately mounted to the manifold 206 so as to provide a balanced system having substantially the same mass distribution, moments of inertia, and elastic moduli about bending axes, respectively such as illustrated in FIG. 6A, for example. In the present example, where the drive mode is the first out of phase bending mode, the conduits 208A and 208B are driven by the drivers 214 in opposite directions about their respective bending axes W-W and W'-W'. A drive signal in the form of an alternating current can be provided by one or more meter electronics 20, such as for example via lead 110, and passed through the coil to cause both conduits 208A, 208B to oscillate. FIG. 6B illustrates a highly exaggerated conduit 208A, 208B motion for clarity sake.

The sensor assembly 202 shown includes a pair of pickoffs 220, 220' that are affixed to conduits 208A, 208B. More particularly, a first pickoff component 222A, is located on conduit 208A and a second pickoff component 222B is located on conduit 208B. Additionally, a first pickoff component 222'A, is located on conduit 208A and a second pickoff component 222'B is located on conduit 208B. In the embodiment depicted, the pickoffs 220, 220' may be electromagnetic detectors, for example—pickoff magnets and pickoff coils that produce pickoff signals that represent the velocity and position of the conduits 208A, 208B. For example, the pickoffs 220, 220' may supply pickoff signals to the one or more meter electronics 20, such as those depicted in FIG. 1. Those of ordinary skill in the art will appreciate that the motion of the conduits 208A, 208B is proportional to certain characteristics of the flowing material, for example, the mass flow rate and density of the material flowing through the conduits 208A, 208B.

In an embodiment illustrated by FIG. 2, the flow inlet and outlet 210, 210' comprise flow splits 230 (only visible proximate the outlet 210') in the fluid path to accommodate the pickoffs 220, 220', which further allows the pickoffs 220, 220' to be centered vertically on the sensor assembly 202. These splits 230 may be absent in embodiments.

In the prior art example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105' and one or more temperature sensors 107, such as a resistive temperature detector (RTD), and use this information to measure a characteristic of a flowing material. The present flowmeter 200 comprises a similar scheme, but these aspects are omitted from FIGS. 2-6B for clarity.

According to an embodiment, the construction of the flowmeter 200 may comprise machining, extruding, welding, brazing, additive manufacturing, and any other construction technique known in the art. The sensor assembly 202 employs a conduit 208A, 208B that allows a compact configuration and thus an effective use of the space within an encapsulating pipe or case 224 (FIG. 2). By providing the ability to fit the entire sensor assembly in a circular cross-sectioned case (i.e. a cylinder), the ease and cost of manufacturing is greatly reduced. Furthermore, secondary containment vessels (not shown) may be easily incorporated into a particular flowmeter 200. The sensor assembly 202 having the geometry illustrated displays high sensitivity to flow, which is generally associated with low frequency sensors, yet still has a relatively high drive frequency, which is beneficial for good zero stability.

Figure 5:
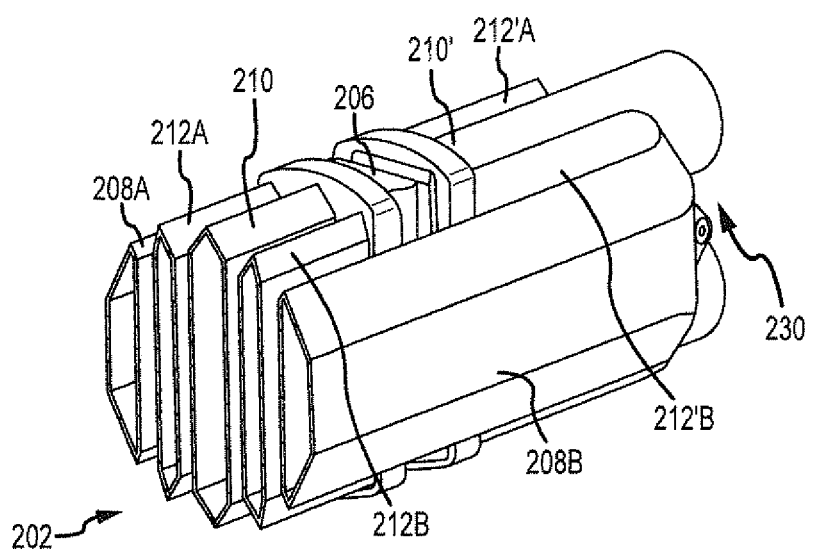
FIG. 5 illustrates yet another cross-sectional view of a sensor assembly according to an embodiment.

Turning to FIG. 5, a cross-section of the sensor assembly 202 is illustrated according to an embodiment. In an embodiment, the sensor assembly 202 maintains a constant cross-sectional area through the flow sensor's flow path. The velocity of a process fluid through a flow path of non-circular cross-section is approximated by calculating its hydraulic diameter, however. Therefore, in an alternate embodiment, a constant cross-sectional hydraulic diameter is maintained through the sensor assembly. In an embodiment, the constant cross-sectional hydraulic diameter is constrained to the relationship between cross-sectional area and enclosed perimeter of each segment according to:

$$\frac{4 \times \text{Area}}{\text{Perimeter}} = \text{Hydraulic Diameter} \quad \text{(Equation 1)}$$

Other formulas may, however, be utilized to calculate cross-sectional hydraulic diameter, and Equation 1 is provided only as an example.

Further modelling experiments comparing flow sensitivity between the present embodiments and a comparably sized prior art flowmeter, which is a relatively low-frequency meter (~80 Hz) having high flow sensitivity were conducted. The geometry of the embodiments provided result in a sensor assembly 202 having relatively high drive frequency (~235 Hz)—which is historically associated with lower flow sensitivity and greater sensor stability—yet still maintain relatively high flow sensitivity. Specifically, the embodiments provided result in a sensor assembly 202 with about three times the drive frequency of the prior art meter (which results in greater stability) while still having approximately 25% greater flow sensitivity than the prior art flowmeter. In an embodiment, the drive frequency is between 175 and 260 Hz. In another embodiment, the drive frequency range is between 140 and 295 Hz. In yet another embodiment, the drive frequency range is between 110 and 325 Hz. This frequency range is merely an example, and should in no way limit the potential frequency range of operation of the present embodiments.

The present invention as described above provides various systems and methods related to variably modulated flow conduits. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

What is claimed is:
1. A flowmeter (200), comprising:
a flow inlet (210);
a flow outlet (210');
a manifold (206);
a first conduit (208A);
a second conduit (208B);
wherein the flow inlet (210) is fluidly coupled to a first end of the first conduit (208A) and a first end of the second conduit (208B) by first fluid passages defined by the manifold, and the flow outlet (210') is fluidly coupled to a second end of the first conduit (208A) and a second end of the second conduit (208B) by second fluid passages defined by the manifold;

wherein a path of fluid flow through the flowmeter comprises fluid entering the flowmeter via flow inlet (210) followed by entering and being split by the first fluid passages of the manifold (206), followed by fluid flow through each of the first and second conduits (208A, 208B) respectively, followed by fluid flow re-entering and being re-combined by the second fluid passages of the manifold (206), followed by flow into the flow outlet (210'), wherein the fluid exits the flowmeter;

at least one of a driver and a pickoff coupled to both the first conduit and the second conduit.

2. The flowmeter (200) of claim 1, wherein the first and second conduits (208A, 208B) are configured to be driven in opposite directions about respective bending axes.

3. The flowmeter (200) of claim 1, wherein the first and second conduits (208A, 208B) maintain a constant cross-sectional area through an entirety of a fluid flow path.

4. The flowmeter (200) of claim 1, wherein the first and second conduits (208A, 208B) maintain a constant cross-sectional hydraulic diameter through an entirety of a fluid flow path.

5. The flowmeter (200) of claim 1, wherein the first and second conduits (208A, 208B) are configured to be symmetric in X, Y, and Z planes.

6. A flowmeter (200), comprising:
a flow inlet (210);
a flow outlet (210');
a manifold (206);
a first conduit (208A);
a second conduit (208B);
wherein the flow inlet (210) is fluidly coupled to a first end of the first conduit (208A) and a first end of the second conduit (208B) by first fluid passages defined by the manifold, and the flow outlet (210') is fluidly coupled to a second end of the first conduit (208A) and a second end of the second conduit (208B) by second fluid passages defined by the manifold;

wherein the flow inlet and flow outlet comprise a first cross-sectional profile and the first conduit and second conduit comprise a second cross-sectional profile that is different from the first cross-sectional profile; and wherein a path of fluid flow through the flowmeter comprises fluid entering the flowmeter via flow inlet (210) followed by entering and being split by the first fluid passages of the manifold (206), followed by fluid flow through each of the first and second conduits (208A, 208B) respectively, followed by fluid flow re-entering and being re-combined by the second fluid passages of the manifold (206), followed by flow into the flow outlet (210'), wherein the fluid exits the flowmeter.

7. The flowmeter (200) of claim 6, wherein at least one cross-sectional profile is hexagonal.

8. The flowmeter (200) of claim 6, wherein the first and second conduits (208A, 208B) are configured to be driven in opposite directions about respective bending axes.

9. The flowmeter (200) of claim 6, wherein the first and second conduits (208A, 208B) maintain a constant cross-sectional area through an entirety of a fluid flow path.

10. The flowmeter (200) of claim 6, wherein the first and second conduits (208A, 208B) maintain a constant cross-sectional hydraulic diameter through an entirety of a fluid flow path.

11. The flowmeter (200) of claim 6, wherein the first and second conduits (208A, 208B) are configured to be symmetric in X, Y, and Z planes.

* * * * *